D. I. GARRETSON.
TOOL HANDLE.
APPLICATION FILED JULY 29, 1914.
1,114,250.
Patented Oct. 20, 1914.
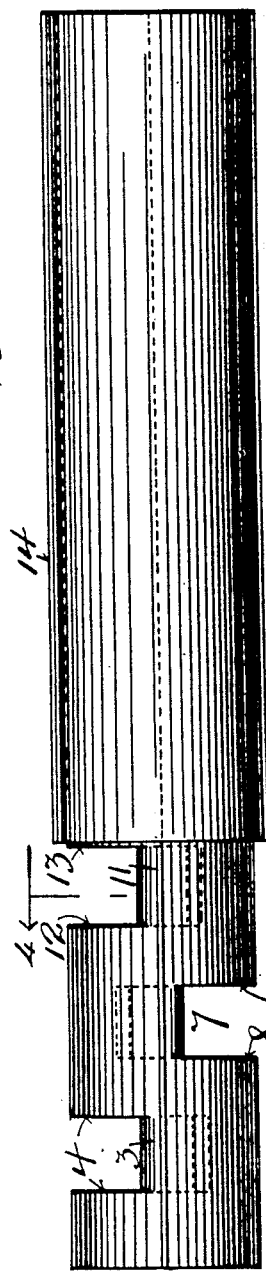
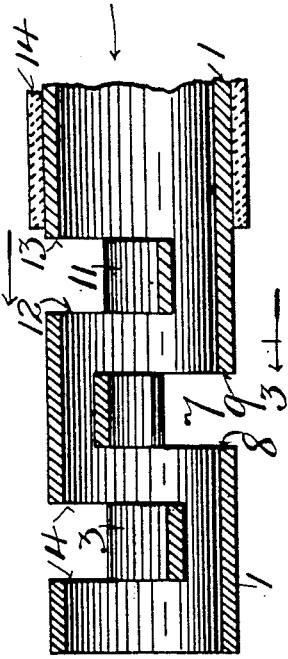
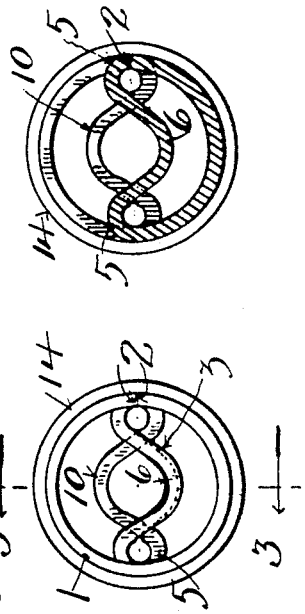
Witnesses:
Inventor
David I. Garretson
By his Attorney
Charles G. Hensley.

UNITED STATES PATENT OFFICE.

DAVID I. GARRETSON, OF NEW YORK, N. Y.

TOOL-HANDLE.

1,114,250.   Specification of Letters Patent.   Patented Oct. 20, 1914.

Application filed July 29, 1914. Serial No. 853,805.

*To all whom it may concern:*

Be it known that I, DAVID I. GARRETSON, a citizen of the United States, and a resident of the borough of Brooklyn, city of New York, county of Kings, and State of New York, have invented certain new and useful Improvements in Tool-Handles, of which the following is a specification.

My invention relates to tool handles and, while it is adapted for various kinds of tools it is especially advantageous when used for soldering coppers.

The object of my invention is to provide a handle of metal which may be made very inexpensively of sheet metal and into which the shank of the tool may be driven; which will not separate from the tool no matter how roughly it is used; and which when used on soldering coppers will not be injured by the heat nor become losened from the tool by reason of the heat.

Another object of my invention is to provide a handle suitable for soldering coppers, which will not be heated to an uncomfortable degree, but which will radiate the heat rapidly enough to keep the handle down to a comparatively low temperature. The result is, that I am able to supplant the ordinary wooden handles and avoid their inherent disadvantages.

In the drawings forming part of this application, Figure 1 is an elevation on an enlarged scale of a handle embodying my invention in the preferred form, Fig. 2 is an end view thereof, Fig. 3 is a longitudinal sectional view, taken on the line 3—3 of Fig. 2, and Fig. 4 is a sectional view taken on the line 4—4 of Fig. 1.

The handle is made of flat, sheet metal and is formed into tubular shape.

The handle proper consists of a tubular body 1 which is cut from sheet metal and afterward rolled or otherwise formed into the tubular shape. The edges 2 of the metal abut against each other, at least when the shank of the tool is driven in as hereinafter explained. The tube is formed of a single piece of sheet metal, so that there are no parts to be connected or attached, and none which can become loosened or detached; and furthermore, the article as sold is complete, homogenous, and ready for use.

Several straps are formed from the metal of the tube, and which are turned inwardly and coöperate to hold the shank of the tool within the tube. Near one end of the tube there is formed a strap 3 which is made by slitting or sawing the metal along parallel lines 4 to partly detach a strap of metal 3 from the tube. This strap remains connected at each end 5 to the tube, but intermediate its ends it is curved inwardly and toward the opposite side of the tube. The strap 3 it will be observed, is arranged one side of the tube as defined by a diameter passing through the meeting line of the edges 2. Further along the tube there is another strap 7 which is similar to the strap 3, it being formed from the metal tube between slits or cuts 8, 9. This strap is curved inwardly toward the opposite side of the tube to form a lop 10, but, since it is formed on the opposite side to the strap 3 it will be just reversely positioned. That is, the straps 3 and 7, are made at opposite sides of the tube and are bent in opposite directions, inwardly of the tube. When the tube is viewed endwise it will be noted that the straps 3 and 7 form crossing loops 6, 10.

There is preferably a third strap formed beyond the others, in order to more positively hold the tool. I have shown, therefore, a third strap 11, which is similar to those just described, but it preferably forms a somewhat smaller loop; that is, the lines 12, 13 along which the metal is severed are of less extent than the corresponding lines of the straps 3, 7. Therefore, the strap 11, when bent inwardly, will not extend quite as far across the interior of the tube as the strap 3. This arrangement is preferable where the shank of the tool tapers, as is generally the case with soldering coppers. The strap 11 preferably is formed on the same side of the tube as the strap 3, and on the opposite side to the strap 7, so that the several straps are alternately disposed.

In order to provide a better gripping surface and to remove the hands from contact with the metal I prefer to inclose the grip portion of the handle with a shell of cardboard, asbestos, or other suitable material. For this purpose I have shown a tube 13, of cardboard placed over and sealed to the tubular body 1 and extending from near the third strap to the end of the tube. This covering comprises a closed ring and besides serving to protect the hands it also keeps the tube from spreading open and the edges 2 from getting out of alinement during handling and before the tool is inserted.

In order to attach the handle, the shank of the tool is inserted through the loops of the several reversely arranged straps and a blow is struck against the end of the tool or handle to drive the shank tightly in place. There is sufficient elasticity to the straps to permit the tool shank to be driven into very tight hold. By reason of the disposition of the straps the strain caused by the tool shank forced therein tends to draw the opposite halves of the tube together and to hold the abutting edges 2 tightly together, so that the tube is as permanent as if made of seamless tubing. By having the edges 2 arranged to abut, the tube will not collapse when the tool shank is driven in. By means of the arrangement herein shown there is provided a handle which is complete and homogenous before as well as after it is applied to the tool and it is very inexpensive to manufacture.

The slits or cuts 4, etc., may be made while the metal is flat, for instance at the time the blank is being cut, and the straps may be bent in, also while the metal is flat, or, the cuts may be made and the straps bent after the tube has been formed.

By arranging the straps as herein shown the shank of the tool is inclosed within the handle and the hand is protected from it. Furthermore, the tool is centered in relation to the handle. The ends of the handle are left open and there is so little surface of contact between the tool and handle that very little of the heat (where the handle is used for a soldering copper) is conducted to the tubular body 1 and whatever is conducted thereto is very rapidly radiated.

Having described my invention, what I claim is:

1. A device of the character described, comprising a body formed from sheet metal into tubular shape to provide a hollow tool handle and provided with integral straps formed by partially severing and bending portions of the metal inwardly in the tube to form oppositely arranged loops adapted to receive therethrough a tool shank.

2. A device of the character described, comprising a body formed from sheet metal into tubular shape to provide a hollow tool handle open at the ends, and provided with integral straps formed by partially severing and bending portions of the metal inwardly in the tube to form oppositely disposed loops adapted to receive therethrough a tool shank and to hold the same separated from the tubular body, said loops being arranged whereby the driving of the tool shank thereinto will serve to hold the edges of the tubular body abutting and thereby preventing the tubular body from opening or collapsing, and a tube inclosing the handle portion of said tubular body.

Signed at the city, county, and State of New York, this 24th day of July, 1914.

DAVID I. GARRETSON.

Witnesses:
A. B. DOLLARD,
CHARLES G. HENSLEY.

Copies of this patent may be obtained for five cents each, by addressing the "Commissioner of Patents, Washington, D. C."